Patented Nov. 8, 1932

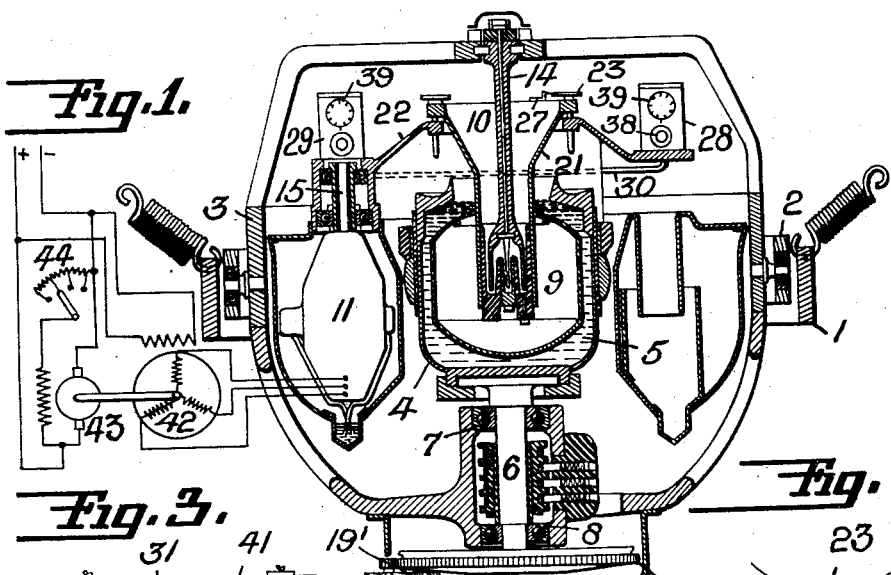

1,886,606

UNITED STATES PATENT OFFICE

HERBERT H. THOMPSON, OF MOUNTAIN LAKES, NEW JERSEY, AND ERIC C. SPARLING, OF GARDEN CITY, NEW YORK, ASSIGNORS, BY MESNE ASSIGNMENTS, TO SPERRY GYROSCOPE COMPANY, INC., A CORPORATION OF NEW YORK

CONSTANT PERIOD GYROCOMPASS

Application filed May 20, 1927. Serial No. 192,999.

This invention relates to improvements in the damping systems for gyro compasses, especially of the very accurate type required for naval work. Experience has shown that an undamped period of oscillation of about 85 minutes is the best period for a gyro compass. If, however, a gyro compass is designed for this period in a certain latitude and the latitude is changed the period will also be changed in accordance with the equation $$P = 2\pi\sqrt{\frac{I\omega}{mgl\, \Omega \cos L}}$$

where P represents the undamped period, I the moment of inertia of the gyro wheel, $\omega$ the angular velocity thereof, $m$ the equivalent mass of the pendulous factor, $g$ the acceleration of gravity, $l$ the effective length of the pendulous factor, $\Omega$ the earth's angular velocity, and L the latitude. Therefore, in compasses for very accurate work, it is usual to have means for varying the pendulous factor to maintain the period constant for different latitudes, that is, the pendulous factor $ml$ is increased as the latitude increases so as to keep the factor $mgl\, \Omega \cos L$ constant. It is also apparent from the equation that instead of varying the pendulous factor for this purpose "$\omega$" or the speed factor of the gyro wheel may be varied or both variations could be employed on the same instrument.

In the types of compasses, however, where the damping is applied by means independent of the pendulous factor, such as by means of a liquid level device, which abstracts energy from the system, trouble has been experienced in obtaining proper settling of the compass as the pendulous factor is varied. The same difficulty would also be experienced in all types of compasses if attempts were made to vary the rotor speed for this purpose. After much experimentation we have determined that this trouble is due to the damper. Prior to our invention, for instance, if a compass, having a damper of the liquid level type and of the normal value about 66%, (i. e. designed to damp out an oscillation of 30 degrees in about three hours at this latitude) where to have its pendulous factor adjusted to give an undamped period of 85 minutes at the equator, it would be found that, as the gravitational factor had been considerably reduced whereas the damping factor had remained constant, the actual damping had increased so that the settling curve of the compass would be altered and instead of oscillating across the meridian and settling accurately the compass would move slowly toward the meridian without a definite period and with a settling curve of asymptotal form and would not settle accurately on the meridian. This behavior is due probably to the fact that the compass is now more than dead beat, and the tilt is destroyed by the damper before the compass reaches the meridian. On the other hand, if the compass were moved to a latitude of 65 degrees and the pendulous factor adjusted for that latitude, the settling curve of the compass would again be changed and the compass would require much longer to settle since in this case the gravitational factor has been increased and the damping is, therefore, relatively smaller.

Furthermore, if a fixed damping factor for such a compass be chosen that would give the required damping characteristic at or near the equator the settling time at this and higher latitudes would become so long as to be detrimental in service. For instance, a reduction of the damping from the customary value of 66% to 40% at this latitude would more than double the time required for the compass to settle. We propose, therefore, to make the damping factor of a compass maintain a constant relation to the gravitational factor in order to keep the settling curve of the compass the same at all latitudes.

It is the purpose of this invention, therefore, to design a new type of damper for compasses of the type above referred to in which the damping factor remains relatively constant with respect to the changing pendulous factor so that the percentage damping, or in other words the settling curve of the compass, remains substantially the same.

It is a further object of the invention to provide a ready means for maintaining the period of the gyro compass constant in different latitudes where it is not easily possible to vary the pendulous factor. This I propose to accomplish by varying the speed of rotation of the gyro rotor, preferably by varying the speed of the synchronous generator used to drive the rotor.

Referring to the drawing wherein a preferred form of the invention is illustrated, Fig. 1 represents a vertical section of an Anschutz type compass showing our invention applied thereto from which the application of the invention to other types of compass will be readily apparent.

Fig. 2 is a plan view of the same.

Fig. 3 is a sectional detail of our adjustable damping means.

Fig. 4 is a detailed plan view of the adjustable means for varying the gravitational element.

Fig. 5 is a detailed end elevation of the graduated dial and adjustable knobs for varying the damping factor.

The compass proper is shown as supported within the usual gimbal rings 1 and 2 in a large bowl-shaped open framework 3. Within the bowl is journaled the follow-up support 4, which in this instance is a container for mercury 5 supported on a stem 6 extending below the same and journaled in vertical guide bearings 7 and 8. Floated in the mercury is a float 9 which supports the framework 10 on which the gyroscopes proper 11, 12 and 13 are mounted. The said framework is centered by a stem 14 depending from said frame 3. Each gyroscope is journaled for turning about a vertical axis 15, 16, 17 within the frame 10 and may be connected thereto directly or indirectly by centralizing springs 18 and 19. The support 4 is usually caused to follow the float 9 in azimuth by a follow-up motor 18' at the base geared through reduction gearing 19' to large gear 20 on stem 6. The gyroscopic system is made pendulous about the center of buoyancy of the float, by which mounting the pendulous factor of the compass is supplied. The foregoing elements are all elements which are well known in the art and which form no part of the present invention.

For altering the pendulous factor of the gyroscope for different latitudes, we have shown the main framework 10 as divided into two parts, 21 directly secured to the float 9 and 22 which is adjustably suspended from the central stem on the float as by means of adjustable set screws 23, 24 and 25. By adjusting said screws, the part 22 may be raised and lowered relative to the float so that the center of gravity of the system is varied, thereby changing "$l$" of the pendulous factor. If desired, graduations 26 readable upon an index 27 may be provided on the screws so that the same may be set in accordance with the latitude.

Instead of or in addition to altering the pendulous factor for the purpose stated, the rotor speed may be varied by any suitable means. Where the rotors are driven by polyphase synchronous motors, this may readily be accomplished by varying the speed of the A. C. generator 42. Said generator is shown as driven from a D. C. shunt motor 43, the speed of which is varied by adjusting the field rheostat 44 in accordance with the latitude.

The employment of both adjustments together on a compass has the advantage that the pendulous factor may then be adjusted in a few large steps and the rotor speed altered within each step. This avoids the necessity for varying the rotor speed within such wide limits as is necessary if the latter method alone is used and thus avoids the serious loss of directive power in high latitudes where a small rotor speed would otherwise be required. At the same time this will avoid the necessity for fine and frequent adjustments of the gravitational factor, which necessarily requires the touching of the sensitive element and the consequent disturbance of the same, which variation of the rotor speed does not require.

For damping the compass we employ a novel arrangement of a liquid level device or devices having means for varying the effectiveness of the damper, preferably by varying the effective area of the liquid in the level. As shown, the damper comprises a plurality of liquid containers 28 and 29 connected by a restricted passage or tube 30. Each container has therein a means for carrying the area of the surface of the liquid therein which is in direct communication with the said tube. Preferably this means is in the form of a slidable piston or partition 31 which may be threaded on a threaded stem 32 journaled in the container and provided with a knurled thumb-piece 33 for adjusting the same in accordance with the latitude. Preferably, said stem has an axial bore 34 running therethrough and communicating with the liquid through the end 35 of the bore at the outer end of the stem and through bore at the outer end of the stem and through a small lateral hole 36 near the inner end. A small needle valve 37 is threaded in the end of said stem so that it may close or open said bore at will, said valve being adjusted by thumb piece 38. It will be understood that the said valve 37 is opened during or immediately after a change in the adjustment of the partition so as to equalize the liquid on both sides thereof to preserve the balance of the compass, but at other times the valve remains closed so that the liquid to the right of the partition in Fig. 3 is not in communication with tube 30. If desired, an auxiliary dial 39 graduated for latitude may be provided, which is slowly turned by the movement of the partition 31 by having the stem 40 thereof provided with large pitch threads or spirals 41 and threaded in an aperture in the partition, so that as the partition is moved the stem and dial 39 are turned.

According to our invention, at the time the pendulous factor is altered for different latitudes, the operator also adjusts the partition in the liquid damper by turning thumb piece 38 so as to keep the settling curve of the compass substantially the same. This avoids excessively heavy damping near the equator, with the consequent loss of a definite settling point and also too light damping in high latitudes, which results in the compass taking an excessive time to settle after a disturbance.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a gyroscopic compass, means for varying a factor thereof for different latitudes to maintain the period of the compass substantially constant, a damping means thereon, and separate means for correspondingly varying the damping means to maintain the settling curve substantially the same for all latitudes.

2. In combination a gyroscopic compass having a pendulous factor, of means for varying the pendulous factor for different latitudes, a damping means thereon, independent of said pendulous factor, and means for correspondingly varying the damping means.

3. The combination in a gyroscopic compass, of means for varying the rotor speed for different latitudes, a damping means thereon, and means for correspondingly varying the damping means.

4. In combination with a gyroscopic compass having a synchronous motor rotor drive, of means for keeping the period constant, comprising means for varying the speed of the supply generator for said motor in accordance with the latitude.

5. In a gyroscopic compass having a synchronous motor rotor drive and a damping factor, of means for keeping the period constant, comprising means for varying the speed of the supply generator for said motor and the damping factor, whereby both the period and settling characteristics are maintained substantially constant.

6. In combination, a gyroscopic compass having a pendulous factor, of means for varying the pendulous factor for different latitudes, means for varying the rotor speed for different latitudes, a damping means, and means for varying the damping means to maintain the damping coefficient substantially constant.

7. In combination with a gyroscopic compass having a motor driven rotor and a pendulous factor, of a plurality of means for keeping the period constant for widely different latitudes comprising means for varying the rotor speed and means for varying the pendulous factor.

In testimony whereof we have affixed our signatures.

HERBERT H. THOMPSON.
ERIC C. SPARLING.